United States Patent

Boudot et al.

[15] 3,647,182
[45] Mar. 7, 1972

[54] SHUTOFF VALVE ASSEMBLY

[72] Inventors: W. Donald Boudot; Robert C. Carl, both of Cincinnati, Ohio

[73] Assignee: Dover Corporation, Cincinnati, Ohio

[22] Filed: Mar. 16, 1970

[21] Appl. No.: 19,936

[52] U.S. Cl. ................................................. 251/361
[51] Int. Cl. ............................................... F16k 27/00
[58] Field of Search ............. 251/361, 363; 137/515.5, 527, 137/527.8, 515.7

[56] References Cited

UNITED STATES PATENTS

| | | | |
|---|---|---|---|
| 2,525,799 | 10/1950 | Hecker | 251/361 X |
| 2,744,539 | 5/1956 | Jones | 251/361 X |
| 2,819,868 | 1/1958 | Cauffman | 251/363 X |
| 3,029,835 | 4/1962 | Biello et al. | 137/515.5 |
| 3,053,278 | 9/1962 | Verheul | 251/363 X |
| 3,189,037 | 6/1965 | Callejo | 251/363 X |
| 3,191,619 | 6/1965 | Allen | 137/527 X |
| 3,204,930 | 9/1965 | Bredtschneider et al. | 251/361 |
| 3,346,008 | 10/1967 | Scaramucci | 251/363 X |
| 3,394,731 | 7/1968 | Elliott | 251/363 X |
| 3,532,320 | 10/1970 | Fisch | 251/316 X |

Primary Examiner—Samuel Scott
Attorney—Kinney & Schenk

[57] ABSTRACT

An emergency shutoff valve assembly has its valve seat supported by its casing so as to be easily replaceable in the field.

6 Claims, 4 Drawing Figures

PATENTED MAR 7 1972 3,647,182

INVENTORS
ROBERT C. CARL
W. DONALD BOUDOT

*Kenney & Schenk*
ATTORNEYS

SHUTOFF VALVE ASSEMBLY

In U.S. Pat. No. 3,489,160 to Moore, there is shown an emergency shutoff valve assembly in which the valve is moved to a closed position when a fusible link fuses. The assembly also includes a tubular member, which extends above the ground and has a weakened portion formed therein by a groove so that the tubular member can shear to cause closing of the valve also.

In the aforesaid Moore patent, the valve seat for the valve is supported on the tubular member. In one embodiment, the valve seat is integral with the tubular member while it is press fitted into the tubular member in the other embodiment.

When it is necessary to replace the valve seat in the aforesaid Moore patent, a new tubular member must be provided with either embodiment if the replacement is to be made immediately in the field. In the embodiment with the valve seat press fitted into the tubular member, the tubular member may be readily used again after the seat has been removed. However, this removal cannot be accomplished economically in the field.

The present invention is an improvement of the valve assembly of the aforesaid Moore patent in that the valve seat may be formed separate from the tubular member in some embodiments of this invention. Accordingly, when the valve seat must be replaced, this may be accomplished rather quickly with the present invention without the necessity of having to employ another tubular member in these embodiments.

In another embodiment of the present invention, the valve seat is formed integral with the tubular member in a similar manner to one form of the invention in the aforesaid Moore patent. However, in this embodiment of the present invention, a simplified detachable connecting arrangement secures the tubular member to the casing of the assembly by the tubular member being threadedly connected to the casing. Additionally, a single sealing and locking member is preferably employed with this embodiment of the present invention. Thus, this form of the present invention is an improvement over the aforesaid Moore patent in that it is not necessary to use an annular support flange on the tubular member whereby the cost is reduced. Furthermore, this embodiment of the present invention has only the single connection to the casing.

An object of this invention is to provide a removable valve seat for a shutoff valve assembly.

Another object of this invention is to provide an improved valve seat arrangement for a shutoff valve assembly.

Other objects, uses, and advantages of this invention are apparent upon a reading of this description, which proceeds with references to the drawing forming part thereof and wherein.

Figure 1:
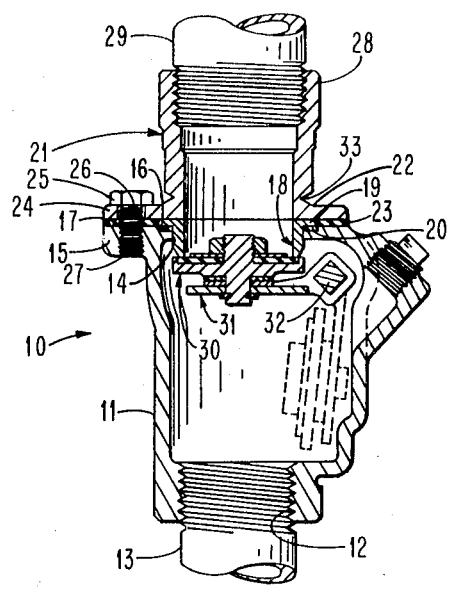
FIG. 1 is a sectional view of a shutoff valve assembly showing one form of valve seat of the present invention.

Referring to the drawing and particularly FIG. 1, there is shown a shutoff valve assembly 10 of the type shown and described in the aforesaid Moore patent. The valve assembly 10 includes a hollow casing, housing, or body 11 having an opening 12 at its lower end. The opening 12 is threaded for connection to exterior threads on a conduit 13, which leads to a storage tank (not shown) buried in the ground. Thus, fluid such as gasoline, for example, can flow to the valve assembly 10 from the storage tank.

The casing 11 has an opening 14, which has its axis coaxial with the axis of the opening 12, in its upper end 15. The upper end 15 is formed with an annular flat surface 16, which surrounds the opening 14, and an annular flat surface 17, which surrounds the surface 16.

A substantially cylindrical shaped valve seat 18 is disposed within the opening 14 and has an annular flange 19 on its upper end for support by the annular support surface 16 of the upper end 15 of the casing 11. A seal 20, which may be a gasket or an O-ring, for example, is disposed between the lower surface of the flange 19 and the surface 16 to prevent leakage between the valve seat 18 and the casing 11.

The valve assembly 10 includes a tubular member 21, which is formed with an integral annular flange 22 at its lower end. The lower surface of the tubular member 21 bears against the upper surface of the valve seat 18 so that the tubular member 21 is disposed in spaced relation to the surface 17 of the upper end 15 of the casing 11. A seal 23, which may be a gasket or an O-ring, for example, is disposed between the surface 17 of the casing 11 and the bottom surface of the flange 22 of the tubular member 21 to prevent fluid leakage between the tubular member 21 and the casing 11.

The flange 22 of the tubular member 21 has a plurality of ears 24 (one shown) formed thereon for cooperation with ears on the upper end 15 of the casing 11. The tubular member 21 is removably or detachably connected to the casing 11 by screws 25 (one shown), which extend through openings 26 in the ears 24 of the flange 22 and into aligned threaded openings 27 in the upper end 15 of the casing 10. The screws 25 also urge the seals 20 and 23 into sealing engagement with the cooperating surfaces.

The tubular member 21 has its upper end 28 interiorly threaded to receive exterior threads on a conduit 29 for connection thereto. The conduit 29 extends upwardly from the valve assembly 10 for connection to a dispensing system, which is mounted on support posts (not shown) in the manner shown and described in the aforesaid Moore patent. It should be understood that any other type of connection between the upper end 28 of the tubular member 21 and the conduit 29 may be employed as mentioned in the aforesaid Moore patent.

The casing 11 has a valve 30 pivotally mounted therein for movement between an open position (phantom line position) and a closed position in which the valve 30 engages the lower end of the valve seat 18. The valve 30 is mounted on a carrier 31, which is pivotally mounted in the casing 11 by a shaft 32 in the manner shown and described in the aforesaid Moore patent.

The valve 30 is moved to its closed position whenever the fusible link fuses because of the temperature as described in the aforesaid Moore patent. Likewise, the valve 30 is moved to its closed position when the tubular member 21 is subjected to an abnormal force as described in the aforesaid Moore patent. It should be understood that the tubular member 21 is connected to the linkage for the valve 30 in the same manner as shown and described in the aforesaid Moore patent.

The tubular member 21 has an annular groove 33 formed therein as shown and described in the aforesaid Moore patent. The groove 33 allows shearing of the tubular member 21 to occur in the manner described in the aforesaid Moore patent.

The opening 14 in the casing 11 has a diameter sufficient to allow the valve 30 and its mounting elements to pass therethrough during assembly. After these elements have been assembled within the casing 11, the valve seat 18 is disposed on top of the seal 20, which rests on the support surface 16 of the casing 11. When the tubular member 21, which has the same inner diameter as the valve seat 18, is connected to the casing 11 by the screws 25, there is sufficient force exerted through the valve seat 18 so that the seal 20 prevents fluid leakage between the lower surface of the flange 19 of the valve seat 18 and the surface 16 of the upper end 15 of the casing 11.

When the tubular member 21 is secured to the casing 11 by the screws 25, the force exerted on the seal 23 causes the seal 23 to engage the adjacent surfaces of the tubular member 21 and the casing 11 to prevent any fluid leakage therebetween. The seal 23 also prevents any leakage between the upper surface of the flange 19 of the valve seat 18 and the lower surface of the tubular member 21 since the seal 23 is in surrounding relation to the flange 19 of the valve seat 18.

Figure 2:
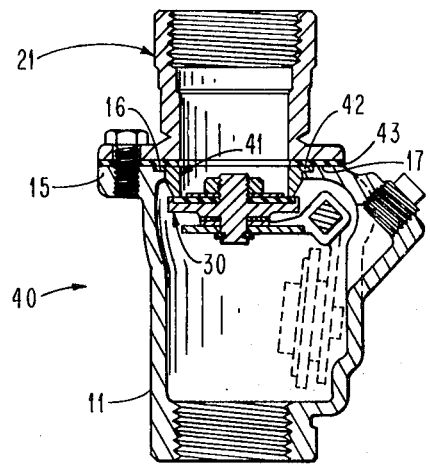
FIG. 2 is a sectional view of a shutoff valve assembly in which another embodiment of the valve seat of the present invention is used.

Referring to FIG. 2, there is shown a valve assembly 40, which is similar to the valve assembly 10. The valve assembly 40 includes both the casing 11 and the tubular member 21 of the valve assembly 10 of FIG. 1. The valve assembly 40 also has the valve 30 pivotally mounted in the casing 11.

However, a substantially cylindrical shaped valve seat 41 is employed instead of the valve seat 18, and an annular flange 42 of the valve seat 41 rests directly on the support surface 16 of the upper end 15 of the casing 11. A single seal 43, which may be a gasket for example, is disposed between the lower surface of the tubular member 21 and the upper surface of the flange 42 of the valve seat 41 and between the lower surface of the tubular member 21 and the upper surface 17 of the casing 11.

Thus, in the embodiment of FIG. 2, the valve seat 41 is again supported by the casing 11. However, only the single seal 43, which has a smaller inner diameter than the outer diameter of the flange 42 of valve seat 41 and an outer diameter greater than the outer diameter of flange 42 required to prevent fluid leakage between the casing 11, the valve seat 41, and the tubular member 21.

Figure 3:
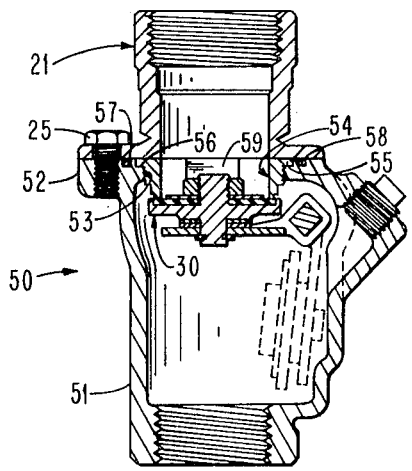
FIG. 3 is a sectional view of a shutoff assembly in which a further modification of the valve seat arrangement of the present invention is employed.

Referring to FIG. 3, there is shown a shutoff valve assembly 50, which is similar to the valve assembly 10. The valve assembly 50 has a casing, housing, or body 51, which is similar to the casing 11 and is connected to the conduit 13 in the same manner as the casing 11. The casing 51 has the valve 30 pivotally mounted therein in the same manner as previously described for the casing 11.

The casing 51 has its upper end 52 formed with a threaded opening 53 to cooperate with threads on a portion of an outer surface of a substantially cylindrical shaped valve seat 54. The valve seat 54 has an annular flange 55 at its upper end bearing against a flat annular surface 56 on the upper end 52 of the casing 51.

The valve assembly 50 includes the tubular member 21 in the same manner as do the valve assemblies 10 and 40. The tubular member 21, which has the same inner diameter as the valve seat 54, is secured to the casing 51 by the screws 25 in the same manner as the tubular member 21 is secured to the casing 11.

The upper end 52 of the casing 51 has an annular groove 57 in its upper surface to receive an annular seal 58, which may be a gasket or O-ring, for example. Accordingly, when the tubular member 21 is secured to the casing 51 by the screws 25, the seal 58 engages the adjacent surfaces of the tubular member 21 and the upper end 52 of the casing 51 to prevent any fluid leakage therebetween.

Because of the threading of the valve seat 54 within the opening 53 in the casing 51, the flange 55 of the valve seat 54 has a tight fit against the surface 56 of the casing 51. This fit is normally sufficiently tight to prevent any fluid leakage between the valve seat 54 and the casing 51. However, if there should be any leakage, the position of the seal 58 also would prevent fluid leakage between the valve seat 54 and the casing 51 from escaping to the exterior of the valve assembly 50.

Because of the fit between the flange 55 and the surface 56 of the casing 51, the groove 57 could be replaced by a groove in either the lower surface of the tubular member 21 or the upper surface of the valve seat 54 with the seal 58 therein to prevent leakage therebetween. Furthermore, it should be understood that the groove 57 could be formed in the lower surface of the tubular member 21 rather than the upper surface of the casing 51 when the seal 58 prevents leakage between the casing 51 and the tubular member 21.

The valve seat 54 has its inner surface 59 formed with six or eight sides, for example, to receive an appropriate tool for turning the valve seat 54 relative to the casing 51. This enables the valve seat 54 to be threaded into and out of the threaded opening 53 in the casing 51.

By threading the valve seat 54 into the casing 51, the valve seat 54 does not depend upon the tubular member 21 being secured to the casing 51 for the valve seat 54 to be disposed in the desired position. Accordingly, in the embodiment of FIG. 3, the valve 30 can remain in its closed position even when the tubular member 21 is removed for field replacement thereof or replacement of the seal 58.

Figure 4:
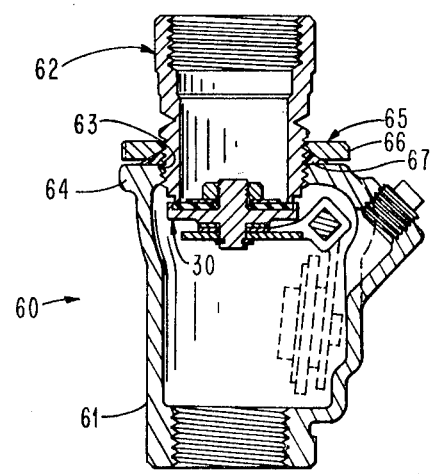
FIG. 4 is a sectional view of a shutoff valve assembly illustrating still another embodiment of the valve seat of the present invention.

Referring to FIG. 4, there is shown a valve assembly 60, which is similar to the valve assemblies 10, 40, and 50. The valve assembly 60 includes a casing, housing, or body 61, which is connected to the conduit 13 in the same manner as the casing 11. The casing 61 has a valve 30 pivotally mounted therein in the same manner as previously described for the casing 11.

The valve assembly 60 includes a tubular member 62, which has its upper end connected to the conduit 29 in the same manner as the tubular member 21. The lower end of the tubular member 62 has its outer surface threaded for cooperation with a threaded opening 63 in upper end 64 of the casing 61. The lower end of the tubular member 62 extends through the opening 63 into the casing 61 and functions as a valve seat for the valve 30.

The tubular member 62 has a locking nut 65 threaded on its outer threads. The locking nut 65 preferably includes a metallic portion 66 and a resilient portion 67, which may be Teflon, for example.

The resilient portion 67 forms a seal between adjacent surfaces of the tubular member 62 and the upper end 64 of the casing 61. Thus, fluid leakage between the casing 61 and the tubular member 62 is prevented.

One suitable example of the locking nut 65 is sold by Miller Fluid Power Division of Flick-Reedy Corporation, Bensenville, Ill. However, it should be understood that the resilient portion 67 of the locking nut 65 need not be integral therewith. Thus, the resilient portion 67 could be a separate seal from a locking nut so that the resilient portion 67 would be compressed by the locking nut against the upper surface of the upper end 64 of the casing 61 and the adjacent outer threaded surface of the tubular member 62.

In assembling the valve assembly 60 of FIG. 4, the nut 65 must be initially mounted on the tubular member 62 and threaded as far as possible away from the end thereof. Then, the tubular member 62 is threaded into the casing 61 until the lower end of the tubular member 62 is properly positioned relative to the valve 30 so that the lower end of the tubular member 62 functions as the valve seat for the valve 30.

With the tubular member 62 properly located within the casing 61 so that the valve seat is properly disposed relative to the valve 30, the nut 65 is then turned to lock the tubular member 62 in this position. This creates sufficient compression on the resilient portion 67 of the locking nut 65 to form a seal between the adjacent surfaces of the casing 61 and the tubular member 62.

In the arrangement of FIG. 4, the tubular member 62 does not have an enlarged flange thereon for mounting the tubular member 62 on the casing 51 as does the tubular member 21. As a result, there is a reduction in the cost of manufacture of the tubular member 62 in comparison with the cost of the tubular member 21. However, if the valve seat, which is the lower end of the tubular member 62, fails, it is necessary to replace the entire tubular member 62 but this may be quickly accomplished.

An advantage of this invention is that a valve seat for a shutoff valve assembly may be easily replaced. Another advantage of this invention is that the replacement cost for a valve seat for a shutoff valve assembly is reduced.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What is claimed is:

1. A shutoff valve assembly comprising a casing having an opening in one end thereof, a first flat surface surrounding the opening, a second flat surface surrounding the first flat surface, the two flat surfaces being in parallel planes, a wall adjacent the outer edge of the first flat surface extending upwardly to the plane of the second flat surface and forming a shoulder, a circular valve seat extending into the casing inwardly of the flat surfaces, an outwardly extending flange member on the upper portion of the seat, a circular seal member, one of the members being received on the first flat surface, a tubular member having a flange on its lower portion, the tubular member flange engaging the seat flange and the seal and holding the same against the flat surfaces, means engaging the tubular member flange and the casing to fasten the two together, and a valve in the casing normally in an open position and moved into engagement with the valve seat when a predetermined condition occurs.

2. The valve assembly as set forth in claim 1 wherein the flange member is received on the first flat surface and the seal member is received on said second flat surface with an inwardly extending portion extending over and engaging the flange member.

3. The valve assembly as set forth in claim 1 wherein the seal member is received on the first flat surface and the flange member is received on the second flat surface and rests upon and engages the seal member.

4. The valve assembly as set forth in claim 3 wherein there is a second seal member surrounding the flange member and engaging the second flat surface.

5. The valve assembly as set forth in claim 1 wherein the flange member is received on said first flat surface and extends over a portion thereof and the seal member is also received on said first flat surface surrounding the flange member.

6. The valve assembly as set forth in claim 5 wherein the first flat surface has a groove therein with the seal member seated in said groove.

* * * * *